(12) United States Patent
Schmidt (10) Patent No.: US 7,680,964 B2
(45) Date of Patent: Mar. 16, 2010

(54) METHOD AND APPARATUS FOR PROCESSING DATA IN A PROCESSING UNIT BEING A THREAD IN A MULTITHREADING ENVIRONMENT

(75) Inventor: Jürgen Schmidt, Wunstorf (DE)

(73) Assignee: Thomson Licensing, Boulogne-Billancourt (FR)

( * ) Notice: Subject to any disclaimer, the term of this patent is extended or adjusted under 35 U.S.C. 154(b) by 844 days.

(21) Appl. No.: 11/138,245

(22) Filed: May 26, 2005

(65) Prior Publication Data

US 2005/0278473 A1 Dec. 15, 2005

(30) Foreign Application Priority Data

Jun. 10, 2004 (EP) .................................. 04013686

(51) Int. Cl.
  *G06F 3/00* (2006.01)
  *G06F 5/00* (2006.01)
  *G09B 19/00* (2006.01)
  *G04J 3/16* (2006.01)
  *G06F 15/00* (2006.01)
  *G06F 9/30* (2006.01)
  *G06F 9/40* (2006.01)

(52) U.S. Cl. .............................. 710/36; 710/52; 710/30; 710/57; 710/20; 434/118; 370/465; 712/225

(58) Field of Classification Search .................... 710/30, 710/57, 20, 36, 52; 375/240.28; 434/118; 370/465; 712/225
See application file for complete search history.

(56) References Cited

U.S. PATENT DOCUMENTS 4,727,333 A * 2/1988 Dieterich .................... 341/143

5,228,859 A * 7/1993 Rowe .......................... 434/118

(Continued)

FOREIGN PATENT DOCUMENTS

EP 0 901 249 A 3/1999

(Continued)

OTHER PUBLICATIONS

Search Report, Dec. 22, 2004, Jurgen Schmidt.

(Continued)

*Primary Examiner*—Niketa I Patel
*Assistant Examiner*—Farley J Abad
(74) *Attorney, Agent, or Firm*—Robert D. Shedd; Joseph J. Opalach; Jerome G. Schaefer (57) ABSTRACT

A method for improving timing behavior of a processing unit in a multithreading environment is disclosed, wherein the processing unit generates data frames for an output unit by combining data from a plurality of input units, and the processed data are buffered in an output buffer between the processing unit and the output unit. The method comprises sending from the output unit to the processing unit a value corresponding to the filling of the output buffer, calculating a timer value, setting a timer with the timer value, wherein the timer calls the processing unit thread after the specified time. The timer value depends on the value corresponding to the averaged filling of the output buffer. As a result, the average filling of the output buffer is lower compared to conventional thread management, and thus the system is more flexible and reacts quicker.

11 Claims, 5 Drawing Sheets

U.S. PATENT DOCUMENTS

| | | | | | |
|---|---|---|---|---|---|
| 5,369,729 | A | * | 11/1994 | Norris | 704/258 |
| 5,377,317 | A | * | 12/1994 | Bates et al. | 715/789 |
| 5,428,789 | A | * | 6/1995 | Waldron, III | 718/103 |
| 5,968,167 | A | * | 10/1999 | Whittaker et al. | 712/225 |
| 6,052,748 | A | * | 4/2000 | Suominen et al. | 710/57 |
| 2003/0108063 | A1 | * | 6/2003 | Joseph et al. | 370/465 |

FOREIGN PATENT DOCUMENTS

| | | | |
|---|---|---|---|
| EP | 0 953 976 A | 11/1999 | |

OTHER PUBLICATIONS

Ashour G. et al. "Architecture for Varying Multimedia Formats"Proceedings ACM Multimedia 2000 Workshops Marine Del Rey, CA Nov. 4, 2000, ACM Internationoal Multimedia Conference, New York, NY vol. Conf. 8.

Steere, D.C. et al. "A Feedback-Driven Proportion Allocator for Real-Rate Scheduling" Usenix Assn. Proceedings of the 3rd Symposium on Operating Systems Design and Implementation, OSDI '99 (Pub. in Operating Systems Review, OSR Special Issue—Winter 1198 New Orleans, LA) Feb. 22-25, 1999 Symposium on Operating Sys.

Flyod S et al. "Random Early Detection Gateways for Congestion Avoidance" IEEE/ACM Transactions on Networking, IEEE Inc. New York, NY. US vol. 1, No. 4 Aug. 1, 1993 pp. 397-413.

* cited by examiner

Prior Art

Fig.1

Prior Art

METHOD AND APPARATUS FOR PROCESSING DATA IN A PROCESSING UNIT BEING A THREAD IN A MULTITHREADING ENVIRONMENT

This application claims the benefit, under 35 U.S.C. § 119 of European Patent Application 04013686.3, filed Jun. 10, 2004.

FIELD OF THE INVENTION

This invention relates to a method for processing data in a processing unit. In particular, the invention relates to a method for processing data in a processing unit, wherein the processing unit generates data frames for an output unit by combining data from a plurality of input units, and wherein said processing unit, input units and output unit are threads in a multithreading environment.

BACKGROUND

Audio-visual (AV) presentations that are coded according to the Motion Picture Expert Group (MPEG) standard ISO/IEC-14496-1, known as MPEG-4 Systems, may consist of several data streams, e.g. one or more streams for video, one or more streams for audio, and others. The audio streams may have individual, usually standardized sample rates, e.g. 8 kb/s, 16 kb/s, 22.05 kb/s, 32 kb/s, 44.1 kb/s or 48 kb/s for different types of audio streams. Further, these streams consist of packets or frames with attached time-stamps.

Reproduction of such presentations requires individual decoding units for different streams, a processing unit and one or more output units. These decoding, processing and output units may be implemented in so-called multithreading technique, using a microprocessor with operating system (OS) and application software, wherein the mentioned units are implemented as separate software partitions, also called "tasks" or "threads". A thread is an independent unit of executable software that sequentially shares the control of the microprocessor with other threads. Since the threads are called and executed sequentially, they work asynchronously to each other, and may communicate with each other via a messaging application programming interface (API) provided by the operating system, or via function calls. Transmission of data between threads requires the data to be buffered, wherein usually synchronized FIFO-like structures are used for buffering. However, obtaining an acceptable quality of reproduction requires the output data stream, e.g. audio stream, to be continuous and complete at the output unit, i.e. any buffer underflows and buffer overflows must be prevented. To ensure constant data availability at the output unit, commonly a large FIFO buffer is used between the processing unit and the output unit.

Figure 1:
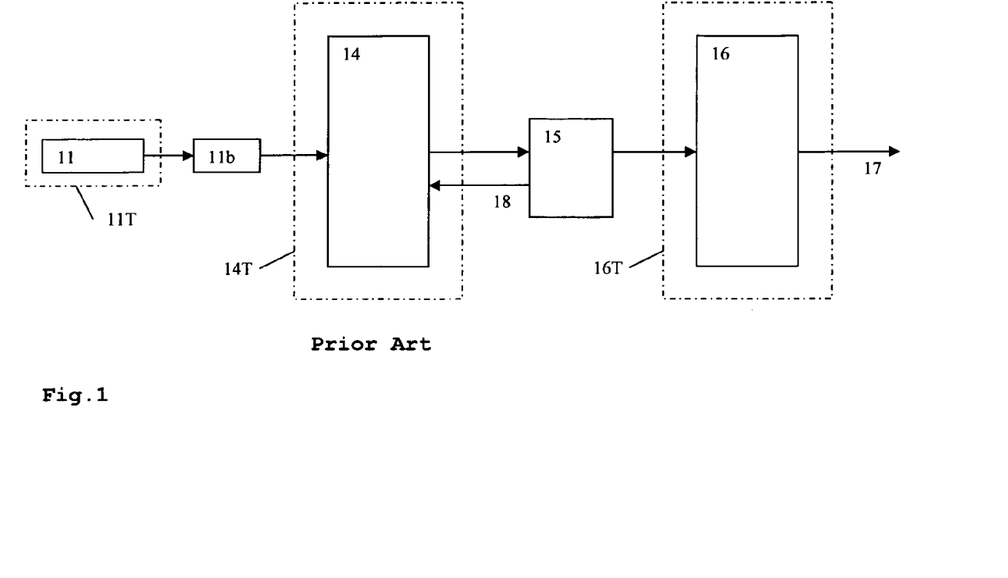

A conventional audio processing system is shown in FIG. 1. Decoded data blocks from a source stream are read from a decoder 11 via a frame FIFO 11b into a processing unit 14 where they are processed. The processed data blocks are written to a block-organized FIFO 15 that feeds the output module 16. The output module 16 generates a continuous stream 17 of audio representation data from the data blocks that are read from the frame FIFO 15, using several decoded data blocks simultaneously. When the FIFO 15 is not full, it sends a signal 18, e.g. an exception message, to the processing unit 14. Then the processing unit 14 processes more data from its input until the FIFO 15 is full. Such system may be implemented on a real-time operating system (RTOS) or on a non-RTOS like e.g. Microsoft Windows®. In the latter case, which is preferred because it is cheaper and simpler than a RTOS, separate threads 11T,14T,16T are used for the decoder 11, the processing unit 14 and the output module 16.

SUMMARY OF THE INVENTION

For some applications it is desirable to process data from different sources simultaneously, wherein the sources may have different frame rates and/or sample rates and require separate decoders. E.g. it may be necessary to superpose audio signals from several inputs, e.g. ten or more.

Figure 2:
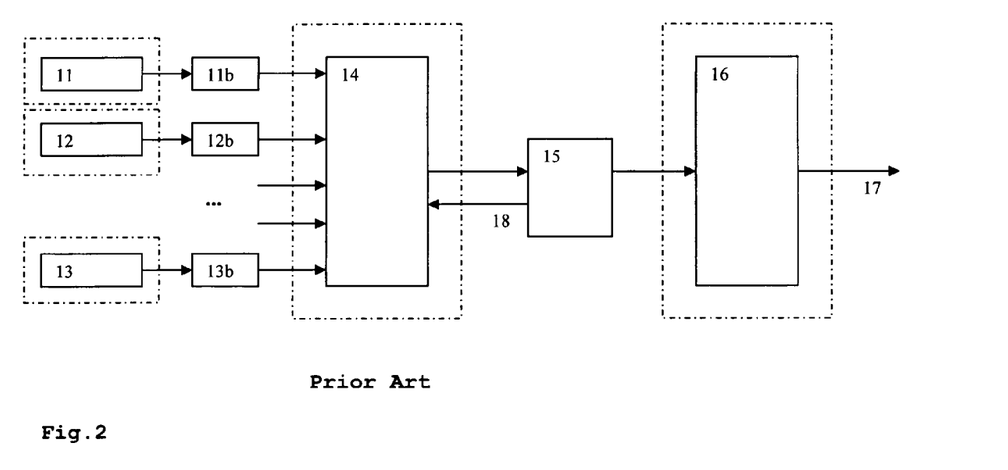
FIG. 2 an extended conventional audio processing system.

FIG. 2 shows a straightforward solution, connecting several decoders 11,12,13 to the processing unit 14. The decoders 11,12,13 run in separate threads, and the thread management of the OS controls, by calling the respective threads, the order in which the different input data are processed. Typically a thread is active as long as it has data in an input buffer to process and space in an output buffer to write to. The processing unit 14 combines data from all its input buffers 11b,12b,13b, and therefore requires data to be available in all these buffers. As a result, the time between successive calls of the processing unit 14 becomes longer than in a single input system, because each of the decoder units 11,12,13 tries to fill its respective output buffer 11b,12b,13b completely, as controlled by the thread management of the OS. Thus, also the total amount of input data to be processed is higher than in a single input system. This leads to stronger oscillations of the filling of the output buffer. Particularly when the microprocessor is heavily loaded, the system may become too slow to process the input streaming data, which require processing similar to real-time, and if the thread management is for general purpose and not optimized it may even block due to a kind of bottleneck effect. This may lead to data loss, i.e. not all input data arrive at the output module 16, which is not acceptable for some data types, such as e.g. high quality audio data.

The described multi-input system running under a non-RTOS e.g. in an audio-video presentation application leads to unpredictable timing behavior of the processing unit under heavy load, e.g. when input data from several different audio sources are to be processed while additionally the microprocessor has to perform other tasks. As a result, synchronization between audio and video is difficult due to unpredictable delay between the decoding of audio packets and audio rendering in the output unit. Further, the long time between successive calls of the processing unit thread also causes higher response time to user interactions, e.g. commands, which are in a multithreading system typically also executed by the processing unit. Thus, it takes longer for user commands to become effective.

The problem to be solved by the invention is to provide a method for improving the timing behavior of a processing unit, wherein the processing unit generates data for an output unit by combining data from a plurality of input units, wherein all the mentioned units are threads in a multithreading environment and may have different time bases. A particular problem is to provide such method for an audio or audio-video reproduction device for multiple multimedia stream data. This problem is solved by the method disclosed in claim 1.

According to the invention, the timing behavior is improved by calling the processing unit in shorter time intervals, using a mechanism superordinate to the thread management of the OS. In particular, the invention comprises using a timer unit to call the processing unit thread, and setting the timer individually. Advantageously, this leads to a more even distribution of the microprocessors processing capacity. Further, the inventive method may increase the priority of the processing unit thread independent from the thread management of the OS, and reduce the oscillation of the filling of the output buffer. This leads e.g. to better audio-video synchronization and shorter delay for user interaction.

Whenever the processing unit thread is called, the filling of the output buffer is measured, and the result of the measurement is used to determine the time before the next call of the processing unit thread. As long as the filling is below a defined threshold, e.g. during initialization, the processing unit repeats the cycle of processing a frame, writing it to the output buffer, and measuring again the output buffer filling, without setting the timer unit. When the output buffer has reached the threshold, a timer value is calculated from the measured output buffer filling, the timer unit is set with the calculated timer value, wherein the timer calls the processing unit thread when its time has elapsed, and the processing unit thread may be terminated until it is called again by the timer, or by thread management of the OS.

The time period determined by the timer value is so that the processing unit will usually be called by the timer, and not by the thread management of the OS. Therefore, the time between the processing unit processing successive frames depends on the filling of the output buffer, which means that the regulation loop is closed, and thus the regulation is improved. Particularly when the output unit processes in regular time intervals, e.g. 80 ms, an output frame from the output buffer, and an output frame comprises a plurality of input frames, wherein each input frame has a specific sample rate, the invention comprises setting the timer to a value that corresponds to a common multiple of the reciprocals of the input sample rates, but is shorter than the output units time interval. It is particularly advantageous to pick a common multiple, or particularly the least common multiple, of the reciprocals of the input sample rates, e.g. 20 ms for sample rates of 48 kHz, 44.1 kHz, 32 kHz, 22.05 kHz, 16 kHz and 8 kHz, corresponding to reciprocals of 20.83 μs, 22.67 μs, 31.25 μs, 45.35 μs, 62.5 μs and 125 μs.

When a timer is used to call the processing unit thread for processing the frames of a particular output data stream, e.g. audio data, and the load value of the timer depends on the filling of the output buffer, as proposed by the invention, the processing unit may after an initialization phase work in substantially equidistant time intervals. It may be advantageous to use an average buffer filling value for the calculation of the timer value. The average will be calculated over few measurement values from successive calls of the thread, e.g. 2-5 measurement values. A further low-pass filtering of the averaged measurement values can be used e.g. to improve the systems time behavior.

A general purpose timer provided by common microprocessors can be employed to maintain on average a specified maximum time between processing successive frames for a particular output unit. The timer runs in real time, independent from the thread management. Microprocessors and/or operating systems usually provide such timers. The general-purpose timer triggers the processing unit thread for decoding the next frame. Then the timer is loaded with a new value, which is calculated from the filling of the buffer.

Advantageously, a simple calculation can be used for this purpose, e.g. the averaged buffer filling may be input to a linear equation. In this case, it is also possible to input first the measurement value to a linear equation and then calculate an average. This method ensures lossless stream access, i.e. prevents buffer underflow and buffer overflow, and ensures constant minimum delay during processing. This is advantageous e.g. for better audio-video synchronization and quicker responses to user interaction.

The time measured by the timer is an average maximum time with respect to the fact that the microprocessor may be busy with another task when it is triggered, so that it may have to finish the other task first before reacting on the trigger. This case can be handled when the output buffer is large enough for the output unit to continue working.

As a consequence, the average number of data frames or blocks that are stored in the FIFO buffer between the processing unit and the output unit can be lower than in conventional systems, which leads e.g. to shorter response times, better estimation of the presentation time of the audio data, therefore improved audio-video synchronization, and generally better approximation of real-time behavior in a non-real-time system.

An apparatus that utilizes the method is disclosed in claim 8.

The inventive apparatus for processing data receives input data from a plurality of inputs and comprises a microprocessor, a data set, e.g. program data, and a timer, wherein the microprocessor and the data set constitute a data processing unit and a data output unit, both units being threads in a multithreading environment, and wherein data are passed through a buffer from the processing unit to the output unit. Further, the apparatus comprises means for measuring a value corresponding to the filling of the output buffer and providing the value to the processing unit, means for calculating in the processing unit a timer value, wherein the timer value depends on said value corresponding to the filling of the output buffer, and means for setting the timer with the timer value and starting the timer, wherein the timer sends a notification when the time specified by the timer value is elapsed, the notification causing activation of the processing unit thread if it is not already active, or otherwise causing continued activation of the processing unit thread.

The apparatus according to the invention is most advantageous to use if its inputs provide data with at least two different constant input data rates. The invention comprises that the timer is only used when the measured buffer filling is between predefined minimum and maximum values, and that the time specified by the timer value that results from a predefined average buffer filling value is the least common multiple of the reciprocals of the data rates of the inputs. Further, the relationship between the timer value and the output buffer filling value may be linear.

The invention has the following advantages as compared to prior art:

First, a better approximation of real-time processing may be achieved on a system with non-real-time behavior.

Second, an improved time estimation of the presentation time of the output unit is possible, resulting in good synchronization, e.g. audio/video synchronization.

Third, it is possible to perform individual framewise and therefore optimized access to the source streams that are connected with the processing unit.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 a conventional single-input audio processing system.

DETAILED DESCRIPTION OF THE INVENTION

In the following, the problem with prior art systems is described in more detail before preferred embodiments of the invention are described.

FIG. 2 shows a processing unit 14 being the center of a system with several multimedia source streams, which are decoded by separate decoders 11,12,13 and buffered in separate buffers 11b,12b,13b. The decoders 11,12,13 belong to separate time domains or threads that are independent from the time domain of the processing unit 14. The processing unit 14 synchronizes the timestamps between the data from different sources. The output of the processing unit 14 is sent to a frame-oriented FIFO buffer 15. A signal 18 from the buffer 15 transmits the buffer filling level to the processing unit 14, thus requesting more data so as to prevent an underflow when the filling of the buffer 15 is below a defined level. The output of the buffer 15 is driven by an output module 16, which requires in regular intervals data at the buffer output 17. Thus, the output module determines the filling and also the frame-rate of the FIFO buffer 15. The frame size of the output buffer 15 depends on the requirements of the output module 16, but usually the buffer 15 is very large, e.g. fifteen frames. In a typical software realization of such a system, the output module 16 runs in its own thread that is independent from the other threads, particularly from the input buffer threads and the thread of the processing unit 14.

The output buffer 15 is the communication element between the processing unit 14 thread and the output module 16 thread. When filling of the output buffer 15 is requested, the processing unit 14 writes data into the output buffer 15 until the buffer is full. Then the processing unit waits i.e. does nothing or performs other tasks, until the output module 16 has read a data block from the output buffer 15. Therefore the output module 16 determines the filling of the output buffer 15, which in turn determines activation of the processing unit 14.

Figure 3:
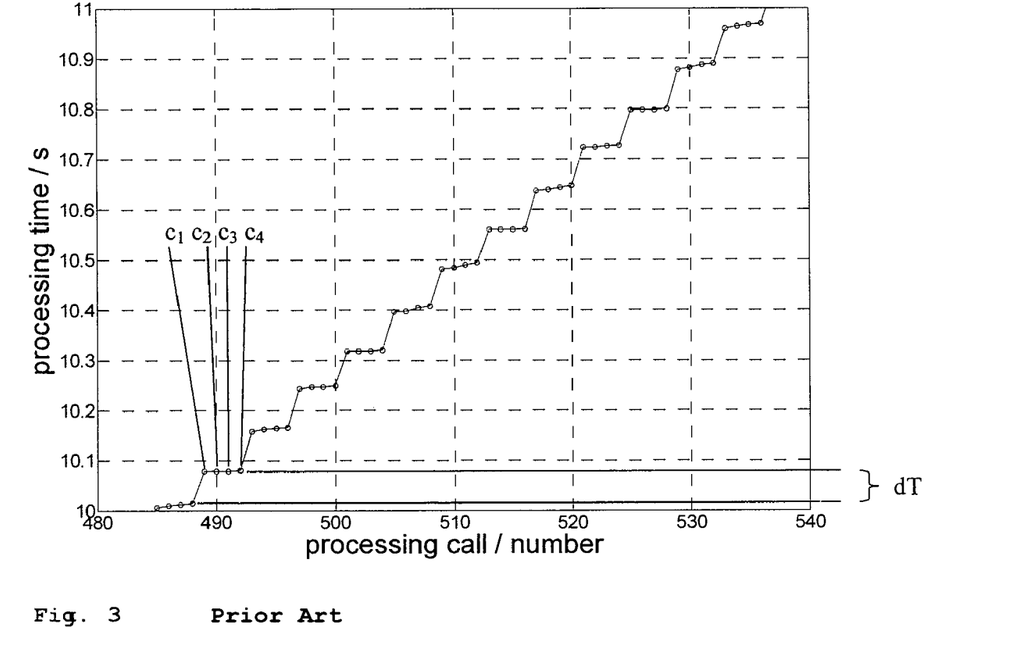
FIG. 3 the timing of burstwise data frame transmission to the buffer in an extended conventional processing system.
Figure 4:
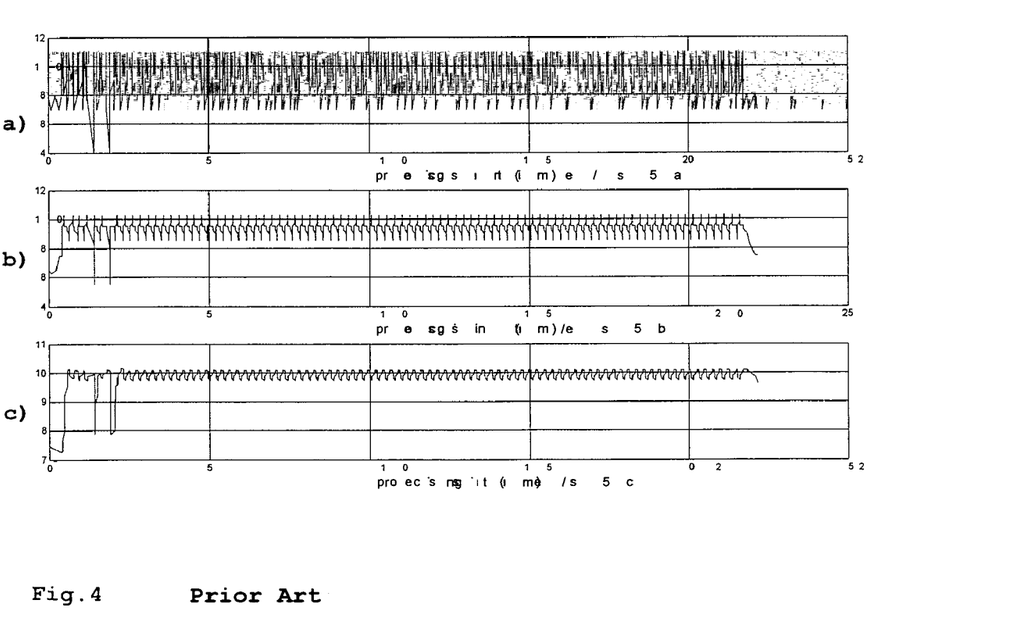
FIG. 4 a buffer filling diagram for an extended conventional processing system.

This thread-oriented processing results in a characteristic that is shown in FIG. 3 for an exemplary audio data stream. In this example the output module has a time equivalent of 80 ms, i.e. works with 80 ms audio frames corresponding e.g. to 3840 audio samples at 48 kHz, and a decoding frame is sufficient for 20 ms audio reproduction. Thus, after an idle time dT of 80 ms the processing unit receives four processing calls c1, ..., c4 in short sequence. FIG. 4a shows the resulting filling of the output buffer, which varies mainly between seven or eight and eleven-decode frames. Averaging the values as in FIG. 4b, and then low-pass filtering as in FIG. 4c shows that on average there are almost ten decode frames in the buffer. The utilized conventional algorithm always tries to keep the output buffer full.

FIG. 3 and FIG. 4a show that the processing unit is called 4 times when a data block has been taken away from the FIFO, i.e. it is called as long as the output buffer is not full. This time behavior is typical for the thread-management of a non-RTOS.

A processing unit for multiple multimedia stream data has to ensure lossless stream access and constant minimum delay processing. One example is a multi-input audio renderer for an MPEG-4 player.

Figure 5:
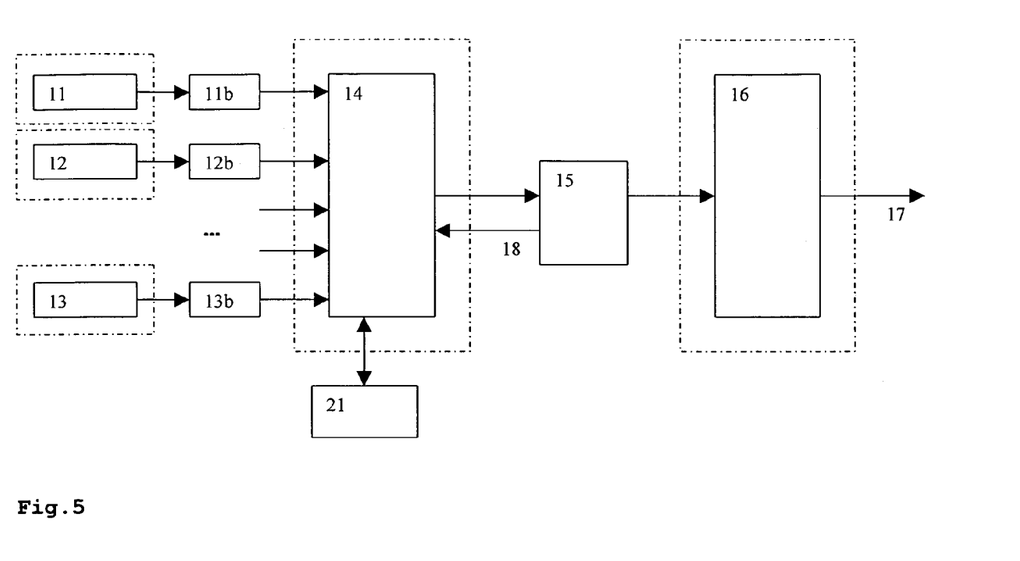
FIG. 5 an advanced audio processing system according to the invention.

According to the invention, the solution is to approximate equidistant starting points for the processing by using a timer that can be set from the processing unit, and that is superordinate to the thread management of the OS. This is shown in FIG. 5. The system is similar to the previously described system of FIG. 2, except that a timer unit 21 is connected to the processing unit 14. The timer unit is independent from the thread management, and particularly it is not part of the processing unit thread. The processing unit 14 sets the timer 21 with a value, e.g. after its signal processing, then starts the timer and goes into a wait mode, so that the microprocessor can do other things. When the timer reaches the end of the programmed time, it calls or "awakes" the processing module again. The processing module does its specific processing and sets the timer with a new value, so that the processing unit can wait for a specified time again, and so on. The timer value can in principle be calculated before or after the signal processing, but since this calculation is done in the processing unit, and the processing unit thread can be interrupted, an early calculation of the timer value is preferable. Then the timer can be started as early as possible, so that the probability for the timer to be active at a potential thread interruption is high.

The timer value is generated from the saturation of the output FIFO module in the following way: The actual filling of the FIFO-buffer is measured. An average value of the filling over the last four measurement values is then calculated and low-pass filtered, e.g. by a $3^{rd}$ order filter with normalized cut-off frequency of 0,1. This signal leads to the timer value with a clipped linear function of the form $$timerValue = k1 * fillingValue + k2$$

wherein k1 must be positive, and fillingValue in this case is the low-pass filtered average value of the filling measurement. The parameter k2 defines the minimum value when the timer is used, while k1 defines the sensitivity of the regulation.

A generalized approach to find an equation that defines the control loop gain of the system is the following: first the range of adjustment of the regulation is individually limited, i.e. the buffer filling must be between minimum and maximum values as e.g. 2<buffer filling<11. Then a target filling is defined, which is eight blocks in this example. Though a linear equation is used here due to its simplicity, other types of equation are possible. In principle, the example can also be used when approximating a linear equation around the operating point being the target filling. Then the slope and the offset, corresponding to k1 and k2 of the above example, can be defined as follows: When timerValue is the value to which the timer shall be set, and fillingValue is the buffer filling value after averaging and low-pass filtering, for the lower limit of the operating range the timerValue shall be 0 for fillingValue being 2. Therefore:

$$k2 = -2 * k1$$

Further, for the average buffer filling of eight the interval time of 20 ms shall result. Therefore:

$$20 = k1 * 8 - 2 * k1$$

which calculates to k1=10/3 and k2=−20/3. Finally, the timerValue is rounded to an integer:

timerValue=integer(10/3*x−20/3+0.5)

Figure 7:
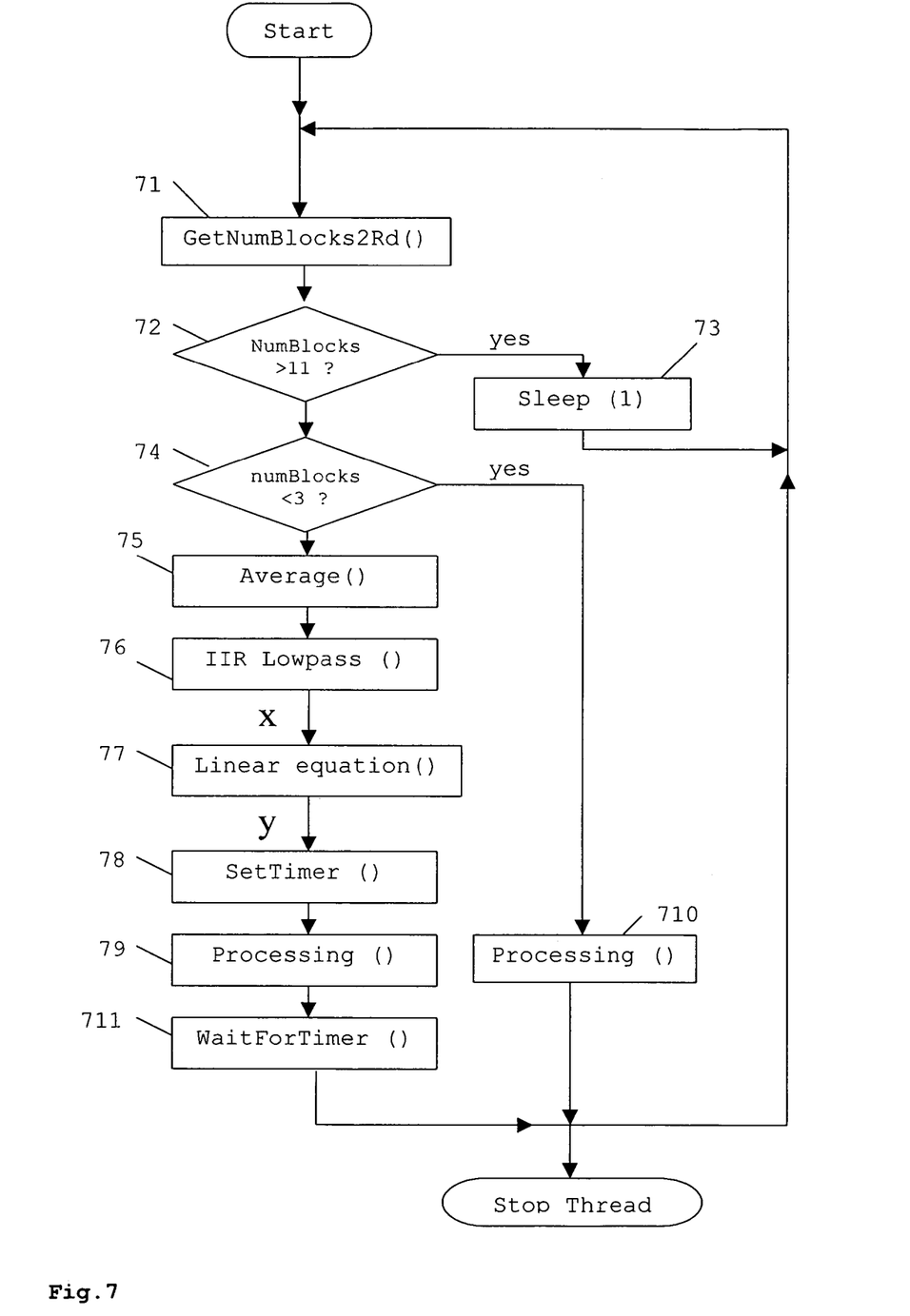
FIG. 7 a flow chart of the inventive data processing method.

The function is clipped with respect to that it is used only when the measurement value 'fillingValue' is at least three and not more than eleven. This is shown in FIG. 7. When the measurement value is below three 74, the timer is not used and the processing unit continues 710 with the next frame immediately. When the measurement value is above eleven 72, the processing unit pauses for a defined time 73, e.g. 1 ms, using a thread management function, before it takes another measurement value 71. The OSs thread management however can interrupt the processing unit thread at any time. If the measurement value is within the defined range, it is averaged 75 and low-pass filtered 76 before it is input to the above-described equation 77. The equation 77 results in a value that is used to set a timer 78 while the processing 79 of data blocks starts, e.g. audio data blocks. The timer then triggers 711 the next call of the processing unit thread. Therefore, the WaitForTimer( ) step 711 is not actually part of the thread process, but of the processing according to the invention.

Figure 6:
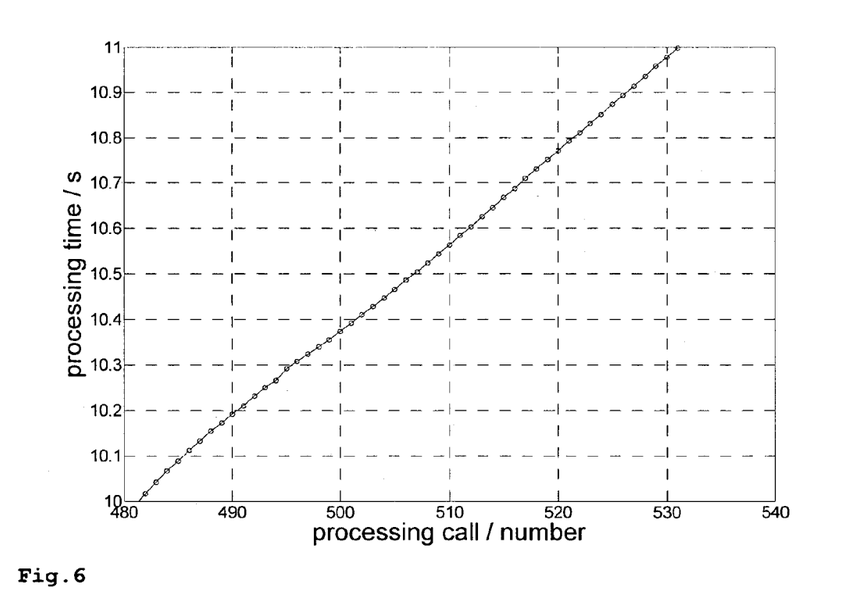
FIG. 6 equidistant processing of frames in an inventive processing system.

For example, k1 is set to 10/3 and k2 is set to −20/3. This results in an average output buffer filling with 8 frames of 20 ms each, as explained above. The effect of this regulation for the processing unit is shown in FIG. 6. The dots represent processing unit calls over time and are in approximately linear sequence, which means almost equidistant calls of the processing unit. As an important consequence of this precise time behavior, it is possible to better estimate the presentation time of the processed data, and to include for the estimation the buffer model of the output module. This is because the median saturation of the buffer is now well known, since it can be adjusted, and the processing time can be measured more exactly. With this knowledge, e.g. better audio/video (AV) synchronization and improved reaction on user interactivity for the processing algorithm can be achieved for AV reproduction.

Figure 8:
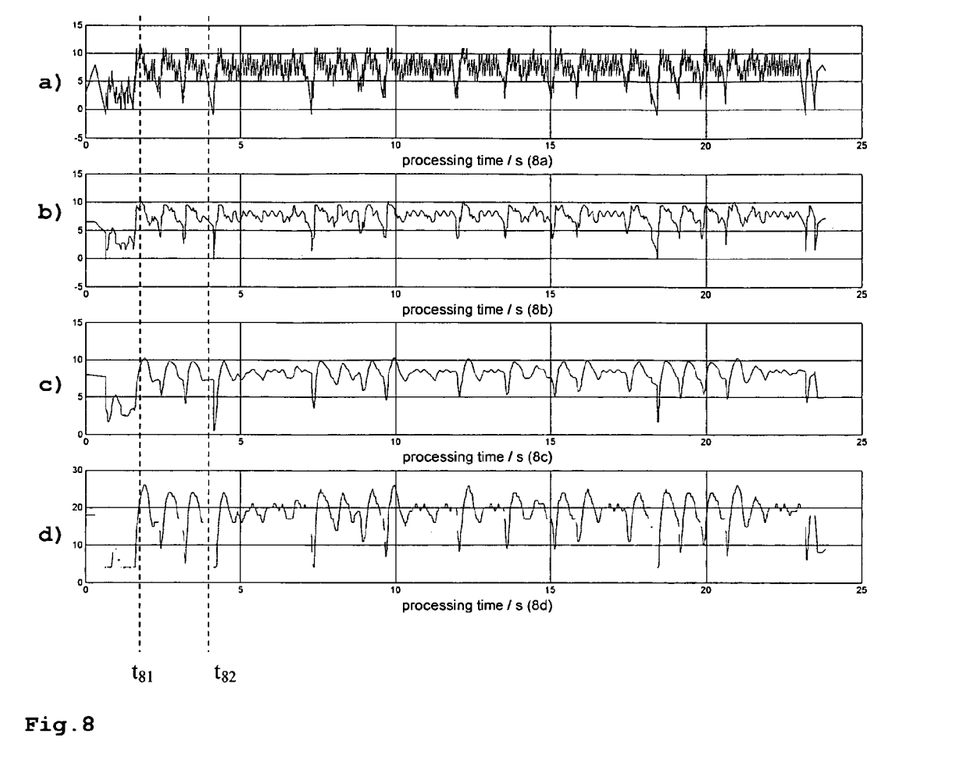
FIG. 8 a buffer filling diagram for the inventive processing system.

FIG. 8 shows the resulting behavior of a system according to the invention. FIG. 8a shows the buffer filling, which is more flexible and on average lower than in FIG. 4a. This means that on average less data are in the output buffer. This effect becomes clearer when considering the average buffer filling, shown in FIG. 8b averaged over four frames of 20 ms, and further averaging by low-pass filtering as shown in FIG. 8c. FIG. 8d finally shows the timer values that are calculated from the low-pass filtered average filling values. When the output buffer is relatively full, e.g. at time $t_{81}$, the low-pass filtered average filling value in FIG. 8c is high and the timer value is high, due to the above-mentioned k1 being positive. Therefore the time between successive calls of the processing unit is relatively long, around or over 20 ms. When the low-pass filtered average filling value is low, the timer value is low, or the timer is even disabled because the timer value is below the specified minimum of three, e.g. at time $t_{82}$, so that the processing unit processes more than one frame with each call.

Figure 9:
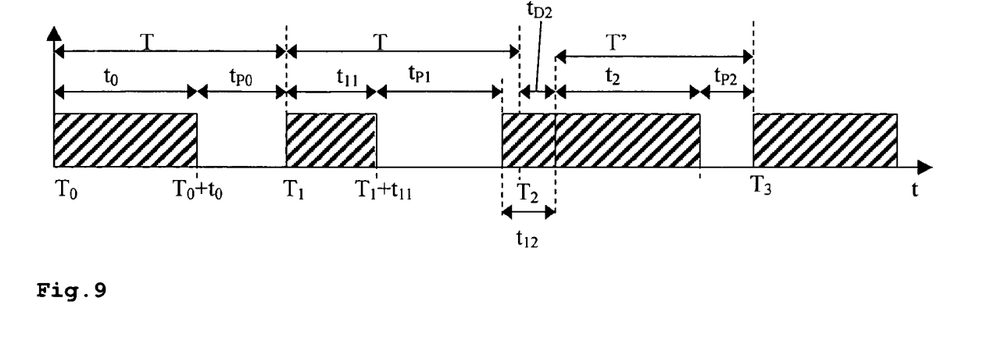
FIG. 9 the timing behavior of the inventive processing unit thread.

FIG. 9 shows the temporal behavior of the processing unit according to one embodiment of the invention. At time $T_0$ a timer value is calculated, the timer is set to that value and the frame processing starts. After a time of $t_0$ the OS terminates the processing unit thread. It is assumed that the available data have been processed within this time. The timer continues to run for a time of $t_{P0}$, and then calls the processing unit thread again at $T_1$, so that the time difference since the previous call of the processing unit is $T=t_0+t_{P0}$. At $T_1$ the processing unit thread becomes active again, measures the buffer filling, calculates a timer value as described above and sets the timer. Then it continues its frame processing, until thread management interrupts it after a time of $t_{11}$ and gives processing power to another process. The timer continues to run. After $t_{P1}$ the thread management calls the processing unit thread again, in order to continue for an additional time of $t_{12}$ the processing of the data packets started at $T_1$. When the next timer event appears at $T_2$, the processing is still ongoing and continues for a further time of $t_{D2}$, but the timer event is stored. When the current thread is finished at $T_2+t_{D2}$, it is immediately restarted again, and measures the buffer filling. Assuming that at this time the buffer is relatively empty, because it was continuously emptied, a lower timer value than before is calculated, corresponding to a shorter time T' for the next timer period. This time T' is equal or near T−$t_{D2}$, depending on the linear equation that deduces the timer value from the buffer filling, so that a substantially equidistant time raster is achieved for the start times of the processing unit thread.

Although the start times of one or more particular threads can be outside the time raster, e.g. at $T_2+t_{D2}$, the method according to the invention is suitable for reestablishing the raster. Further, the actual timer values are adapted to the current situation, and therefore the average time that the processing unit has can be adjusted. The raster time T, being the average value between successive calls of the processing unit, can be exactly adjusted to the application by proper selection of the parameters k1 and k2, and therefore the temporal behavior of the processing unit can be adapted to the temporal behavior of the output unit and the input units, which prevents blocking of the processing unit.

In general, it is advantageous to select the raster time, i.e. the average time between successive calls of the processing unit, to be M milliseconds when the average output time interval is N*M milliseconds, with N being a positive integer larger than one.

The invention comprises different possibilities for when to utilize the timer unit. The calculation of the timer value and the setting of the timer will preferably be done immediately after measuring the buffer filling, although in principle the measurement value can be stored and later be used for the calculation, e.g. within a start sequence or exit sequence of a thread.

In one embodiment of the invention, the timer value is calculated always before processing a frame. In another embodiment, the timer value is calculated whenever the processing unit thread is called, as a start sequence of the thread. In yet another embodiment, the timer value is calculated only before the processing unit thread is terminated, as a part of an exit sequence of the thread. In one embodiment, the timer unit is set immediately after the calculation of the timer value. In another embodiment, the timer unit is set later, or always before terminating the processing unit thread, as a part of an exit sequence of the thread.

The invention is particularly advantageous for implementing a multi-channel input audio renderer, e.g. for MPEG-4 or similar, in a multithreading environment, where the risk of processor overload is high.

What is claimed is:

1. A method for processing data in a processing unit, the processing unit generating data frames for an output unit by combining data from a plurality of input units having at least two different simultaneous sample rates, wherein the processed data are buffered in an output buffer between the processing unit and the output unit, and wherein the processing unit, the input units and the output unit are threads in a multithreading environment and are executed on a same microprocessor, comprising the steps of:

measuring the filling of the output buffer, wherein the
measuring results in a value that is equivalent to a filling
of the output buffer;

calculating from said measured value a timer value,
wherein, when the measured value corresponds to a
predefined value, then the timer value corresponds to a
time that is a common multiple of the reciprocal of the
sample rates of the input units;

setting a timer with the calculated timer value and starting
the timer, wherein the timer sends a notification when
the time specified by the timer value is elapsed, the
notification referring to the processing unit thread; and activating upon said notification the processing unit thread
if it is not already active, or otherwise continuing activation of the processing unit thread.

2. The method according to claim 1, wherein the calculation of the timer value comprises averaging and/or low-pass filtering over a plurality of measured values.

3. The method according to claim 1, wherein the step of setting a timer is only executed if the calculated timer value is between specified minimum and maximum values, and wherein the step of setting the timer is skipped for lower calculated timer values, and the timer is set to the specified maximum value for higher calculated timer values.

4. The method according to claim 1, wherein the timer value is the result of a linear equation of a form timerValue=k1*fillingValue+k2, wherein k1 is positive and is based on a predefined average buffer fill-level, k2 defines a minimum value when the timer is used and fillingValue is said measured value equivalent to the filling of the buffer or to an averaged and/or low-pass filtered filling of the buffer respectively.

5. The method according to claim 1, wherein the output unit reads in a single access of the output buffer a plurality of processed data frames in regular time intervals, and wherein said time intervals are an integer multiple of the time specified, on average, by the timer value.

6. The method according to claim 5, wherein the processed data are audio data, and a time between successive calls of the processing unit is, on average, M milliseconds and an output time interval is, on average, N*M milliseconds, with N being a positive integer larger than one.

7. The method according to claim 1, wherein the time specified by the timer value is, on average, a least common multiple of the reciprocals of the simultaneous sample rates.

8. A method for improving audio-video synchronization in an AV presentation, wherein audio data are processed in a processing unit, the processing unit generating data frames for an output unit by combining data from a plurality of input units, the input units having at least two different simultaneous sample rates, wherein processed data are buffered in an output buffer between the processing unit and the output unit, and wherein the processing unit, the input units and the output unit are threads in a multithreading environment and are executed on a same microprocessor, comprising the steps of:

measuring the filling of the output buffer, wherein the
measuring results in a value that is equivalent to a filling
of the output buffer;

calculating from said measured value a timer value,
wherein, when the measured value corresponds to a
predefined value, then the timer value corresponds to a
time that is a common multiple of the reciprocal of the
sample rates of the input units;

setting a timer with the calculated timer value and starting
the timer, wherein the timer sends a notification when
the time specified by the timer value is elapsed, the
notification referring to the processing unit thread; and activating upon said notification the processing unit thread
if it is not already active, or otherwise continuing activation of the processing unit thread.

9. An apparatus for processing data, the apparatus receiving input data from a plurality of inputs, wherein the input data have at least two different simultaneous sample rates, and comprising a microprocessor, a data set and a timer, wherein the microprocessor and the data set constitute a data processing unit and a data input unit, the data processing unit and the data output unit are threads in a multithreading environment, and wherein data are passed through a buffer from the data processing unit to the data output unit, comprising:

means for measuring a value being equivalent to filling of
the output buffer;

means for calculating from said measured value a timer
value, wherein, if the measured value corresponds to
predefined value, then the timer value corresponds to a
time that is a common multiple of the reciprocal of the
sample rates of the input units; and means for setting the timer with the timer value and starting
the timer, wherein the timer sends a notification when a
time specified by the timer value is elapsed, the notification causing activation of the data processing unit
thread if it is not already active, or otherwise causing
continued activation of the data processing unit thread.

10. The apparatus according to claim 9, wherein the plurality of inputs provide data with at least two different constant input data rates, and wherein the timer is only used if a measured output buffer filling is between predefined minimum and maximum values, and wherein the time specified by the timer value that results from a predefined average buffer filling value is a least common multiple of reciprocals of data rates of the inputs.

11. The apparatus according to claim 9, wherein the time specified by the timer value is a least common multiple of reciprocals of data rates of the inputs.

* * * * *